Patented Jan. 10, 1939

2,143,359

UNITED STATES PATENT OFFICE 2,143,359

FERMENTATION PROCESS OF MAKING WHITE CALCIUM LACTATE

Raymond E. Daly, James F. Walsh, and Haskell C. Needle, Chicago, Ill., assignors to American Maize-Products Company, a corporation of Maine No Drawing. Application August 20, 1937, Serial No. 160,056

10 Claims. (Cl. 195—48)

Our invention relates to calcium lactate and more particularly to a substantially pure white calcium lactate and its method of manufacture.

In the usual processes of manufacturing calcium lactate to produce a pure white product, one or more crystallizations of the product has been necessary to obtain the desired purity and whiteness. These crystallizing operations add appreciably to the expense of the production of the final product both from the standpoint of processing steps and equipment necessary for carrying them out. Furthermore the mother liquor from these crystallizations must be processed to salvage the remaining calcium lactate.

Heretofore, it has not been possible to obtain a white purified calcium lactate directly from the fermentation liquor, i. e. without crystallization, the main reason being that the type of nutrients and relatively long fermentation cycle used produced undesirable colors and odors in the calcium lactate product. The amount of color imparted to the calcium lactate liquor during the fermentation cycle increases with the length of the cycle. When the cycle is relatively long contaminating organisms cause side reactions to take place producing odorous substances such as butyric, valeric and acetic acids. Ordinarily these substances are present in appreciable amount and it is not feasible to decolorize the fermented calcium lactate liquor by common decolorizing agents to obtain directly a white calcium lactate. Special purifying processes such as crystallization are required. In the absence of these special purifications the final product is colored and contains odorous impurities that will not be removed upon drying of the fermented liquor.

In the processes heretofore used for the production of calcium lactate by fermentation of carbohydrates into lactic acid various protein nutrients have been employed as assimilable material for the fermenting bacillus. Examples of these nutrients are molasses, corn germ meal, peptones, glue and various soluble nitrogen compounds such as hexamethylene tetramine, urea, and asparagine. For the production of pure white calcium lactate these nutrients are unsatisfactory in that they introduce directly undesirable soluble substances into the fermented liquor and also give rise to rapid color development in the warm liquors which colors cannot be removed economically. The speed of the fermentation action with these nutrients is relatively slow and consequently provides an opportunity for contaminating substances to form to a considerable extent in the fermentation liquors. Furthermore, the prolonged fermentation at the usual temperature of about 120° F. results in caramelization of the sugars giving the fermented liquor an undesirable dark color. In view of these various contaminations caused principally by the nature of the nutrient used and the consequent prolonged fermentation cycle the calcium lactate product possesses undesired color and impurities. Therefore, it has been the practice to crystallize the calcium lactate out of the fermentation liquors and repeat the crystallizing operation several times to obtain a pure colorless product.

An object of our invention is to provide a method and means for obtaining a substantially pure white calcium lactate directly from fermentation liquors without the necessity of crystallizing.

Another object of our invention is to provide a non-crystallized glass-like white calcium lactate that has a relatively high degree of purity and whiteness.

In accordance with our invention we have discovered that the desired pure white calcium lactate can be obtained directly, without crystallization, from the fermentation liquors by employing the proper type of assimilable material as nutrient in the fermentation process and by rapidly drying the calcium lactate liquors produced. The nutrient that we have found to be particularly satisfactory for use in our invention is non-denatured milk. The usefulness of this material as a nutrient in the production of lactic acid and its advantages over the commonly used nutrients are disclosed in the copending application Ser. No. 155,925 filed July 27, 1937. The superior characteristics of non-denatured milk described in this copending application are used in conjunction with other features of the present invention to produce the desired pure white calcium lactate.

The pertinent features of the process of our present invention are, the use of a nutrient that will not of itself add any undesirable color to the fermentation liquor and will effect a sufficiently rapid fermentation cycle to avoid the formation of undesirable colors and contaminating foreign substances, and drying of this calcium lactate liquor in a sufficiently rapid manner to avoid caramelization and other color forming reactions. Our process may be briefly described as comprising the steps of fermenting a suitable carbohydrate material to form lactic acid while using non-denatured milk as nutrient for the fermenting bacillus, and using calcium carbonate to convert the lactic acid into calcium lactate, neutralizing the fermentation liquors, filtering to remove proteins and heavy metals, acidifying and decolorizing the filtrate to produce a water white calcium lactate solution and rapidly drying this solution while slightly acid to produce the desired high purity white solid calcium lactate. In accordance with this process all of the disadvantages and limitations characteristic of prior processes have been minimized and we have prepared directly from the fermentation liquors a pure colorless calcium lactate without crystallizing.

The carbohydrate materials that may be used satisfactorily in this invention comprise all such materials that are fermentable to form lactic acid and, which of themselves do not directly give any undesirable color or impurity in the final calcium lactate product. The most common example of suitable carbohydrate materials is sugar produced by acid conversion of corn starch.

The Lactobacilli fermenting agents that may be used in this invention include all such bacilli that will not give rise to any undesired color or impurity in the final product and will effect fermentation of the carbohydrate material into lactic acid at a temperature at which any contaminating organisms will be incapacitated. This temperature is normally about 120° F. Examples of bacilli that we have found to be particularly useful are *Lactobacillus delbruckii, leichmanni* and variants thereof.

The non-denatured milk that may be used as nutrient in the fermentation process for producing the desired white calcium lactate of this invention, includes whole, powdered or skimmed milk either in dry or solid form. The dry milk powders obtainable on the market may be used satisfactorily for this purpose. These powders are ordinarily produced by a flash drying operation such as spray drying or drum drying which takes place so rapidly that the proteins in the milk are not denatured.

According to one specific but non-limiting example our process of producing pure white calcium lactate may be carried out as follows:

A mash is made up consisting of: 150 pounds of milk powder, 6600 pounds of sugar (dextrose) and 4600 pounds of calcium carbonate with 50 pounds of diammonium acid phosphate added as an accelerator. Water is added to make 7000 gallons. This mash is inoculated with 300 gallons of a 24-hour culture of the organism, preferably *Lactobacillus delbruckii*. The mash is allowed to ferment until no sugar is shown to be present or until the liquor contains less than 0.1% reducing substances. The fermentation is carried out at 120° F. and takes from 5 to 7 days. It effects a conversion of the sugar into lactic acid which is converted, as fast as it is formed, into calcium lactate by reaction with the calcium carbonate present.

The fermented calcium lactate liquor is then heated to 180° F. and maintained at that temperature for sufficient time to kill all living organisms. Lime, in amount of 100 to 200 pounds is added to the liquor to give it a pH of about 11.0 and the liquor filtered while hot to remove the proteins and heavy metals as insoluble hydroxides. The mash is then filtered and the resulting liquor acidified to a pH of 6 to 7 with lactic acid. This slight acidity helps to prevent undesirable color formation and aids in volatilizing during subsequent steps, any small amount of other organic acids that might be present. The calcium lactate liquor is then decolorized to a water white solution with vegetable carbon and run into a supply tank from where it flows by gravity to a leveling pan which maintains a constant level in a flash boiler. The liquor at a Baumé of 6° to 7° is fed from the leveling pan into the flash boiler which is so constructed that a large thin surface of the liquor is exposed to the heating surface. Accordingly, the concentration of the liquor to a Baumé of 20 to 21 is effected very rapidly without allowing any appreciable formation of color. This heavy liquor is then sprayed into a spray drier where the temperature of the incoming air and gases is around 450° F. and that of the outgoing air about 215° F. Here the liquor is converted into a powder the temperature of which is carefully maintained below the decomposition temperature to avoid discoloration. The powder is then carried into a cyclone where relatively fine and coarse particles of the powder are separated. The calcium lactate powder of desired fineness is then barreled.

Instead of drying the calcium lactate liquor in a spray drier as described above, it may be dried in a drum drier or in any other suitable type of drier wherein the drying operation is carried out with sufficient rapidity to avoid any discoloration of the final calcium lactate product.

The calcium lactate powder resulting from the above described process and rapid drying is very light in color and free of all contaminating volatile substances. It has a color range of 1.5 to 3.25 Brown, as determined on the Lovibond 52 Brown series of glasses. Determinations are taken in a 1" cell of a solution of 10 grams of calcium lactate in 90 cc. of water. In view of the fact that the calcium lactate of our invention is not obtained by crystallizing from solution, but results from rapid drying of the solution, it is a substantially non-crystalline product. Instead, it is found to be a homogeneous glass-like material. Its calcium lactate content, based on the total solids content, ranges between 98% and 99%. This product usually contains less than .5% protein and approximately 5% to 6% moisture, showing a purity of from 93% to 95%.

It is to be understood that various modifications and changes may be made in the materials and processes described hereinabove without departing from the scope of our invention. Some of the novel features of this invention are defined in the appended claims.

We claim:

1. A method of preparing substantially pure, white, non-crystalline calcium lactate by fermentation of a converted starch material with a lactic acid producing Lactobacillus in the presence of calcium carbonate, characterized by using non-denatured milk as the assimilable nutrient for the Lactobacillus, said milk adding no undesired color to the calcium lactate and effecting fermentation at a sufficiently rapid rate to prevent formation of color and contaminating substances, and drying the resulting calcium lactate liquor directly without crystallization.

2. A method of preparing substantially pure white calcium lactate comprising fermenting a converted starch material with a lactic acid producing Lactobacillus of the class consisting of *Lactobacillus delbruckii* and *Lactobacillus leichmanni*, using non-denatured milk as the assimilable nutrient for the Lactobacillus and using calcium carbonate to neutralize the lactic acid formed by fermentation of said converted starch material and to form calcium lactate therefrom, alkalizing the calcium lactate liquor and filtering to remove foreign substances, acidifying the calcium lactate liquor with lactic acid, decolorizing said liquor and rapidly drying to produce a solid, white, non-crystalline calcium lactate.

3. A method of preparing substantially pure, non-crystalline, white calcium lactate comprising fermenting a sugar solution with *Lactobacillus delbruckii* using non-denatured milk as nutrient for said bacillus, using diammonium acid phosphate as accelerator and using calcium carbonate to neutralize the lactic acid formed by said fermentation and convert it into calcium lactate, treating said calcium lactate with lime to precipitate proteins and heavy metals, filtering to remove the precipitate, acidifying said filtrate, decolorizing and drying said filtrate to produce a solid white product.

4. A method of preparing substantially pure, non-crystalline, white calcium lactate comprising fermenting a sugar solution with *Lactobacillus delbruckii* using non-denatured milk powder as nutrient for said bacillus, using calcium carbonate to neutralize the lactic acid formed by said fermentation and convert it into calcium lactate, treating said calcium lactate with lime to precipitate proteins and heavy metals, filtering to remove the precipitate, acidifying said filtrate, decolorizing and drying said filtrate to produce a solid white product.

5. A method of preparing substantially pure, non-crystalline, white calcium lactate comprising fermenting a sugar solution with *Lactobacillus delbruckii* using non-denatured milk as nutrient for said bacillus, using diammonium acid phosphate as accelerator and using calcium carbonate to neutralize the lactic acid formed by said fermentation and convert it into calcium lactate, treating said calcium lactate with lime to precipitate proteins and heavy metals, filtering to remove the precipitate, acidifying said filtrate with lactic acid, decolorizing and spray drying said filtrate to produce a solid white product.

6. A method of producing white calcium lactate comprising fermenting a converted starch sugar with a Lactobacillus of the class consisting of *Lactobacillus delbruckii* and *Lactobacillus leichmanni* to produce lactic acid using non-denatured milk powder as nutrient for said bacillus, converting said lactic acid into calcium lactate liquor, treating said liquor to remove undesirable coagulable solids, acidifying the liquor, decolorizing and rapidly drying said liquor to prevent discoloration.

7. A method of producing white calcium lactate comprising fermenting dextrose with a Lactobacillus of the class consisting of *Lactobacillus delbruckii* and *Lactobacillus leichmanni* using non-denatured milk powder as nutrient, treating the fermented liquor with lime to remove undesired color forming coagulable solids, acidifying with lactic acid, and spray-drying to produce a dry white calcium lactate powder.

8. In a method of producing white calcium lactate by fermenting a converted starch solution with a lactic acid producing Lactobacillus in the presence of calcium carbonate, the improvement comprising using non-denatured milk as the assimilable nutrient for the Lactobacillus.

9. In a method of producing solid white calcium lactate by fermenting a converted starch solution with a lactic acid producing Lactobacillus in the presence of calcium carbonate, the improvement comprising using non-denatured milk as the assimilable nutrient for the Lactobacillus and rapidly drying the calcium lactate to solid white form.

10. In a method of producing white calcium lactate by fermenting a sugar solution with a lactic acid producing Lactobacillus in the presence of calcium carbonate, the improvement comprising using non-denatured milk as the assimilable nutrient for the Lactobacillus, neutralizing the fermentation liquor to effect precipitation of undesired substances and removing the precipitated substances.

RAYMOND E. DALY.
JAMES F. WALSH.
HASKELL C. NEEDLE.